US010762741B2

(12) United States Patent
Oyama et al.

(10) Patent No.: US 10,762,741 B2
(45) Date of Patent: Sep. 1, 2020

(54) INFORMATION PROCESSING DEVICE, STORAGE MEDIUM, AND GAME CONTROL METHOD

(71) Applicant: Universal Entertainment Corporation, Tokyo (JP)

(72) Inventors: Masaki Oyama, Tokyo (JP); Toshikazu Jinnouchi, Tokyo (JP)

(73) Assignee: UNIVERSAL ENTERTAINMENT CORPORATION, Tokyo (JP)

(*) Notice: Subject to any disclaimer, the term of this patent is extended or adjusted under 35 U.S.C. 154(b) by 0 days.

(21) Appl. No.: 16/504,477

(22) Filed: Jul. 8, 2019

(65) Prior Publication Data

US 2020/0013259 A1 Jan. 9, 2020

(30) Foreign Application Priority Data

Jul. 9, 2018 (JP) ................................ 2018-129717

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3213* (2013.01); *G07F 17/3267* (2013.01); *G07F 17/3209* (2013.01)

(58) Field of Classification Search

USPC .............................. 463/1, 22, 25, 30, 39, 40

See application file for complete search history.

(56) References Cited

U.S. PATENT DOCUMENTS

| | | | | |
|---|---|---|---|---|
| 6,517,432 B1* | 2/2003 | Jaffe | G07F 17/32 463/16 |
| 2004/0036218 A1* | 2/2004 | Inoue | G07F 17/34 273/292 |
| 2013/0095905 A1* | 4/2013 | Aoki | G07F 17/3265 463/20 |

* cited by examiner

*Primary Examiner* — Adetokunbo O Torimiro

(74) *Attorney, Agent, or Firm* — Lex IP Meister, PLLC

(57) ABSTRACT

A process of randomly determining symbols to be rearranged within a display frame for each of the first video reel and the second video reel in the slot game, a process of displaying an image for rearranging symbols of the second video reel in the display frame after rearranging the symbols of the first video reel in the display frame based on the random determination, and a process changing a symbol of the first video reel at a position where the special symbol is rearranged to a corresponding symbol of a function that is more advantageous than the symbol of the first video reel in the symbol correspondence table and outputting the result of the slot game are performed.

4 Claims, 10 Drawing Sheets

FIG.5

SYMBOL ARRAY TABLE OF THE FIRST VIDEO REEL

| | REEL 1 | REEL 2 | REEL 3 | REEL 4 | REEL 5 |
|---|---|---|---|---|---|
| 0 | 7 | WATERMELON | BAR | APPLE | WATERMELON |
| 1 | BAR | STRAWBERRY | PLUM | PLUM | STRAWBERRY |
| 2 | 7 | 7 | WATERMELON | WATERMELON | WILD |
| 3 | STRAWBERRY | STRAWBERRY | CHERRY | CHERRY | WATERMELON |
| 4 | PLUM | APPLE | 7 | STRAWBERRY | STRAWBERRY |
| 5 | FROWER | WATERMELON | APPLE | APPLE | 7 |
| 6 | STRAWBERRY | CHERRY | WATERMELON | STRAWBERRY | PLUM |
| 7 | APPLE | 7 | APPLE | WATERMELON | STRAWBERRY |
| 8 | FROWER | STRAWBERRY | 7 | BAR | APPLE |
| 9 | WATERMELON | WILD | APPLE | APPLE | APPLE |
| 10 | CHERRY | WATERMELON | PLUM | WATERMELON | WATERMELON |
| 11 | STRAWBERRY | BAR | STRAWBERRY | STRAWBERRY | CHERRY |
| 12 | CHERRY | CHERRY | CHERRY | PLUM | CHERRY |
| 13 | 7 | FROWER | 7 | 7 | WATERMELON |
| 14 | PLUM | WATERMELON | STRAWBERRY | STRAWBERRY | FROWER |
| 15 | FROWER | PLUM | APPLE | APPLE | WILD |
| 16 | APPLE | WILD | WATERMELON | WATERMELON | BAR |
| 17 | STRAWBERRY | CHERRY | FROWER | FROWER | BAR |
| 18 | APPLE | FROWER | APPLE | APPLE | CHERRY |
| 19 | WATERMELON | WATERMELON | WILD | WILD | PLUM |
| 20 | WATERMELON | APPLE | FROWER | FROWER | 7 |
| 21 | APPLE | WATERMELON | APPLE | APPLE | CHERRY |
| 22 | STRAWBERRY | FROWER | BAR | BAR | 7 |
| 23 | APPLE | APPLE | CHERRY | CHERRY | WATERMELON |
| 24 | BAR | CHERRY | FROWER | FROWER | APPLE |
| 25 | STRAWBERRY | WATERMELON | PLUM | BAR | WILD |
| 26 | WILD | BONUS | BONUS | BONUS | PLUM |
| 27 | APPLE | BONUS | BONUS | BONUS | APPLE |
| 28 | PLUM | BONUS | BONUS | BONUS | 7 |

FIG.6

SYMBOL ARRAY TABLE OF THE SECOND VIDEO REEL

| | REEL 1 | REEL 2 | REEL 3 | REEL 4 | REEL 5 |
|---|---|---|---|---|---|
| 0 | BLANK | BLANK | SPECIAL | BLANK | BLANK |
| 1 | SPECIAL | SPECIAL | SPECIAL | SPECIAL | SPECIAL |
| 2 | SPECIAL | SPECIAL | SPECIAL | SPECIAL | SPECIAL |
| 3 | BLANK | BLANK | BLANK | BLANK | BLANK |
| 4 | BLANK | BLANK | BLANK | BLANK | BLANK |
| 5 | BLANK | BLANK | BLANK | BLANK | BLANK |
| 6 | BLANK | SPECIAL | SPECIAL | BLANK | BLANK |
| 7 | BLANK | SPECIAL | SPECIAL | BLANK | BLANK |
| 8 | BLANK | SPECIAL | SPECIAL | BLANK | BLANK |
| 9 | BLANK | BLANK | BLANK | BLANK | BLANK |
| 10 | BLANK | BLANK | BLANK | BLANK | BLANK |
| 11 | BLANK | BLANK | BLANK | BLANK | BLANK |
| 12 | BLANK | BLANK | SPECIAL | SPECIAL | BLANK |
| 13 | BLANK | BLANK | SPECIAL | SPECIAL | BLANK |
| 14 | BLANK | BLANK | SPECIAL | SPECIAL | BLANK |
| 15 | BLANK | BLANK | BLANK | BLANK | BLANK |
| 16 | BLANK | BLANK | BLANK | BLANK | BLANK |
| 17 | BLANK | BLANK | BLANK | BLANK | BLANK |
| 18 | SPECIAL | BLANK | BLANK | BLANK | BLANK |
| 19 | BLANK | SPECIAL | SPECIAL | BLANK | BLANK |
| 20 | SPECIAL | BLANK | BLANK | BLANK | BLANK |
| 21 | BLANK | BLANK | BLANK | BLANK | BLANK |
| 22 | BLANK | BLANK | BLANK | BLANK | BLANK |
| 23 | BLANK | BLANK | BLANK | BLANK | BLANK |
| 24 | BLANK | BLANK | BLANK | BLANK | SPECIAL |
| 25 | BLANK | BLANK | SPECIAL | SPECIAL | BLANK |
| 26 | BLANK | BLANK | BLANK | BLANK | SPECIAL |
| 27 | BLANK | BLANK | BLANK | BLANK | BLANK |
| 28 | BLANK | BLANK | BLANK | BLANK | BLANK |
| 29 | BLANK | BLANK | BLANK | BLANK | BLANK |
| 30 | BLANK | BLANK | SPECIAL | SPECIAL | SPECIAL |
| 31 | BLANK | SPECIAL | SPECIAL | SPECIAL | BLANK |
| 32 | SPECIAL | SPECIAL | SPECIAL | BLANK | BLANK |
| 33 | BLANK | BLANK | BLANK | BLANK | BLANK |
| 34 | BLANK | BLANK | BLANK | BLANK | BLANK |
| 35 | BLANK | BLANK | BLANK | BLANK | BLANK |

FIG.7

SYMBOL CORRESPONDENCE TABLE

| NORMAL SYMBOL | REPLACEMENT SYMBOL |
|---|---|
| WILD | WILD 2x |
| BONUS | BONUS + WILD |
| BAR | WILD |
| FLOWER | WILD |
| STRAWBERRY | WILD |
| PLUM | WILD |
| APPLE | WILD |
| WATERMELON | WILD |
| CHERRY | WILD |

INFORMATION PROCESSING DEVICE, STORAGE MEDIUM, AND GAME CONTROL METHOD

CROSS REFERENCE TO RELATED APPLICATION

This application is entitled to the benefit of Japanese Patent Application No. 2018-129717 filed on Jul. 9, 2018.

BACKGROUND OF THE INVENTION

1. Field of Invention

The present invention relates to an information processing device, a storage medium, and a game control method.

2. Description of Related Art

Patent Document 1 (Japanese Patent Publication No. 2004-000307) discloses a symbol display device used for a slot game or the like in which symbols are rearranged by receiving a bet. The mechanical reel of the symbol display device is composed of an inner reel and a transparent outer reel, and a symbol of the outer reel is displayed on the symbol of the inner reel to form a composite symbol.

SUMMARY OF THE INVENTION

However, since the conventional symbol display device described above is physical double reels, it is difficult to control each one so that there was no gap at the time of stopping in long-term play, and it was difficult to maintain them when the gap occurs. In addition, the physical appearance of the symbols displayed in duplicate can not be easily changed because of the physical nature, and the application range of the function of the composite symbol is limited.

Therefore, the present invention provides an information processing device, a storage medium, and a game control method capable of improving the application range in a slot game using double reels.

The information processing device according to the present invention comprises: a display for displaying a play image of a slot game, and in the play image, the scroll and stop of a first video reel and a second video reel are repeated in a display frame, and wherein the first video reel has a symbol array in which a plurality of symbols are arranged, and the second video reel has a symbol array in which blank symbols making the plurality of symbols of the first video reel visible and displayed with superposition on the first video reel and at least one special symbol which is capable of hiding at least one symbol of the first video reel are arranged; a memory storing a symbol correspondence table, wherein the symbol correspondence table is one in which a symbol of the first video reel and a symbol of a function that is more advantageous than the symbol of the first video reel are associated with each other; and a controller, wherein in the slot game, the controller performs a process of randomly determining symbols to be rearranged within the display frame for each of the first video reel and the second video reel, a process of displaying an image for rearranging symbols of the second video reel in the display frame after rearranging the symbols of the first video reel in the display frame based on the random determination, and a process of changing a symbol of the first video reel at a position where the special symbol is rearranged to a corresponding symbol of a function that is more advantageous than the symbol of the first video reel in the symbol correspondence table and outputting the result of the slot game.

According to the above configuration, after both the first video reel and the second video reel are scroll-displayed and stop-displayed within the display frame of the display, and the symbols of the first video reel are rearranged in the display frame, when the special symbol of the second video reel is rearranged, a symbol of the first video reel at the position where the special symbol is rearranged is changed to a symbol having an advantageous function associated with the symbol of the first video reel according to the symbol correspondence table stored in the memory to be reflected in the result of the slot game. Thereby, the function of the symbol at the position where the special symbol of the second video reel is rearranged can be easily changed by maintaining the symbol correspondence table stored in the memory, and it is possible to improve the application range of the double reels.

In the information processing device of the present invention, when the special symbol is rearranged to a bonus symbol having a function of triggering a bonus game, the bonus symbol may be changed to a symbol having a function of triggering the bonus game and another alternative function, and the result of the slot game may be output.

Generally, when a bonus symbol that does not constitute a winning combination is rearranged in a symbol display area 21 and the bonus game is not triggered, the bonus symbol inhibits the winning combination by other symbols. According to the above configuration, rearrangement of the special symbol 510 enables the bonus symbol to have other alternative functions as well, which makes it possible to improve the effectiveness of the bonus symbol.

The storage medium of the present invention is a non-transitory storage medium for storing a game program, the game program, when running on a computer having a display and a memory, performing: a process of displaying a play image of a slot game in a display frame of the display, and wherein the scroll and stop of a first video reel and a second video reel are repeated, and wherein the first video reel has a symbol array in which a plurality of symbols are arranged, and the second video reel has a symbol array in which blank symbols making the plurality of symbols of the first video reel visible and displayed with superposition on the first video reel and at least one special symbol which is capable of hiding at least one symbol of the first video reel are arranged; a process of storing a symbol correspondence table in which a symbol of the first video reel and a symbol of a function that is more advantageous than the symbol of the first video reel are associated with each other in a memory; a process of randomly determining symbols to be rearranged within the display frame for each of the first video reel and the second video reel in the slot game; a process of displaying an image for rearranging symbols of the second video reel in the display frame after rearranging the symbols of the first video reel in the display frame based on the random determination; and a process of changing a symbol of the first video reel at a position where a special symbol is rearranged to a corresponding symbol of a function that is more advantageous than the symbol of the first video reel in the symbol correspondence table and outputting the result of the slot game.

According to the above configuration, after both the first video reel and the second video reel are scroll-displayed and stop-displayed within the display frame of the display, and the symbols of the first video reel are rearranged in the display frame, when the special symbol of the second video reel is rearranged, a symbol of the first video reel at the position where the special symbol is rearranged is changed to a symbol having an advantageous function associated with the symbol of the first video reel according to the symbol correspondence table stored in the memory to be reflected in the result of the slot game. Thereby, the function of the symbol at the position where the special symbol of the second video reel is rearranged can be easily changed by maintaining the symbol correspondence table stored in the memory, and it is possible to improve the application range of the double reels.

The game control method of the present invention comprises: displaying a play image of a slot game in a display frame of a display, wherein the scroll and stop of a first video reel and a second video reel are repeated, and wherein the first video reel has a symbol array in which a plurality of symbols are arranged, and the second video reel has a symbol array in which blank symbols making the plurality of symbols of the first video reel visible and displayed with superposition on the first video reel and at least one special symbol which is capable of hiding at least one symbol of the first video reel are arranged; and storing a symbol correspondence table in which a symbol of the first video reel and a symbol of a function that is more advantageous than the symbol of the first video reel are associated with each other in a memory;

randomly determining symbols to be rearranged within the display frame for each of the first video reel and the second video reel in the slot game;

displaying an image for rearranging symbols of the second video reel in the display frame after rearranging the symbols of the first video reel in the display frame based on the random determination; and changing a symbol of the first video reel at a position where a special symbol is rearranged to a corresponding symbol of a function that is more advantageous than the symbol of the first video reel in the symbol correspondence table and outputting the result of the slot game.

According to the above configuration, after both the first video reel and the second video reel are scroll-displayed and stop-displayed within the display frame of the display, and the symbols of the first video reel are rearranged in the display frame, when the special symbol of the second video reel is rearranged, a symbol of the first video reel at the position where the special symbol is rearranged is changed to a symbol having an advantageous function associated with the symbol of the first video reel according to the symbol correspondence table stored in the memory to be reflected in the result of the slot game. Thereby, the function of the symbol at the position where the special symbol of the second video reel is rearranged can be easily changed by maintaining the symbol correspondence table stored in the memory, and it is possible to improve the application range of the double reels.

The present invention can improve the application range of double reels.

BRIEF DESCRIPTION OF THE DRAWINGS

Other than further objects, features and advantages of the invention will appear more fully from the following description taken in connection with the accompanying drawings in which:

FIG. 5 is an illustrative view of a symbol array table of the first video reel.

FIG. 6 is an illustrative view of a symbol array table of the second video reel.

FIG. 7 is an illustrative view of a symbol correspondence table.

DESCRIPTION OF THE PREFERRED EMBODIMENTS

A game system according to an embodiment of the present invention will be described based on the drawings.

(Overview)

Figure 1:
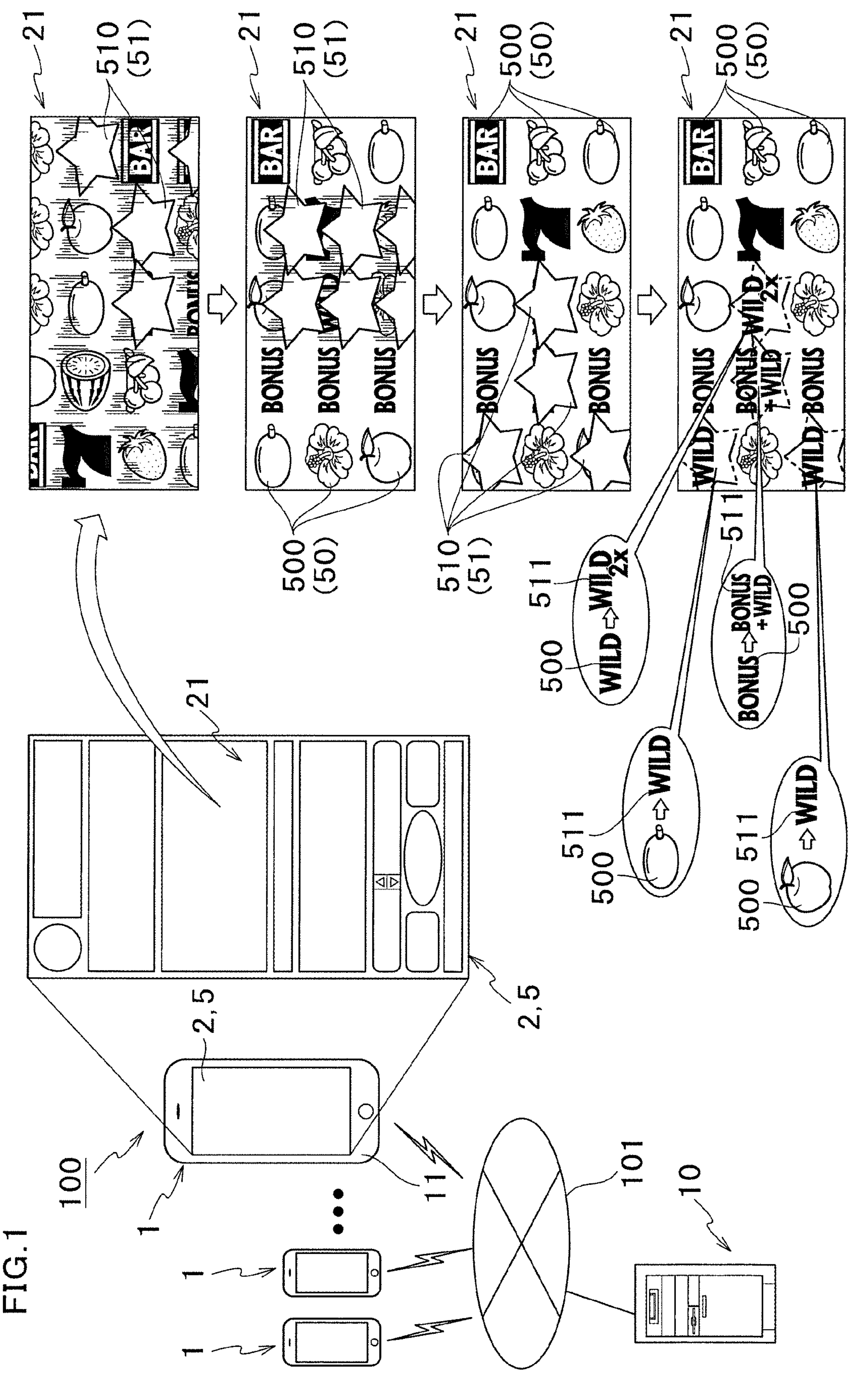
FIG. 1 is an illustrative view showing a schematic configuration of an information processing device according to an embodiment of the present invention.

As shown in FIG. 1, the information processing device 1 according to an embodiment of the present invention is configured to, in the slot game, determine the stop appearances separately for the first reel and the second reel and convert a symbol at a position where a special symbol of the second reel stops.

The information processing device 1 is connected to a server 10 via the Internet line 101 so as to be capable of data communication, and a game system 100 is configured to include the information processing apparatus 1 and the server 10. The game system 100 is not limited to this, and may be configured only by the information processing device 1. Further, the information processing device 1 may mean a game system itself having a terminal device such as a smartphone and a server, and the functions of the information processing device 1 described in the present embodiment may be provided by any of the elements of the game system.

A common application is installed in a plurality of information processing devices 1 via an application store server or the like corresponding to the OS (Operating System) of each information processing device 1. In the present embodiment, a slot game is made playable as a game element in an application installed in the information processing device 1. That is, a user can play the slot game on this application. The slot game may be an add-in for an application. That is, the slot game may be provided by the application store server, the server 10 or the like separately from the application as an additional function of the application. Also, in the application, a plurality of slot games having different effect modes or rules may be playable.

Although the details will be described later, the slot game is started on condition of consumption of cumulative game value. As a result of the slot game, when there is a winning, a game value corresponding to the type of the winning and the consumed game value is added to the accumulated game value. As described above, the information processing device 1 runs a slot game in which the cumulative game value is increased or decreased according to the result. The game value may be information having no monetary value (game point) used only to start the slot game, or may be electronic valuable information corresponding to the monetary value.

As shown in FIG. 1, the information processing device 1 illustrated in the present embodiment is a so-called smartphone, and includes a display 2 provided on the front surface of a housing 11 and a touch panel 5 provided on the entire surface of the display 2. The display 2 is provided with a symbol display area 21 where change display and stop display of symbols are performed when the game is started.

Specifically, a plurality of scroll areas are set in the symbol display area 21, and a symbol array set in each of the scroll areas are scrolled and stopped. Each scroll area is composed of a plurality of cells arranged in the vertical direction. That is, the symbol display area 21 is provided with cells arranged in a matrix of a plurality of columns and a plurality of rows. When the symbols are rearranged, the symbols are displayed in each cell. In the present embodiment, three cells are provided in each of the five rows of scroll areas, but the present invention is not limited to this.

The display 2 displays a play image of the slot game in the symbol display area 21, in which the scroll and stop of a first video reel 50 and a second video reel 51 are repeated, and wherein the first video reel 50 has a symbol array in which a plurality of symbols 500 are arranged, and the second video reel 51 has a symbol array in which blank symbols making the plurality of symbols 500 of the first video reel 50 visible and displayed with superposition on the first video reel and at least one special symbol which is capable of hiding at least one symbol 500 of the first video reel 50 are arranged.

The information processing device 1 randomly determines symbols to be rearranged in the symbol display area 21 for each of the first video reel 50 and the second video reel 51 in such a slot game. Then, the information processing device 1 displays an image in which the special symbols 510 of the second video reel 51 are rearranged in the symbol display area 21 after the symbols 500 of the first video reel 50 are rearranged in the display frame based on the random determination.

Then, when the special symbols 510 are rearranged in the symbol display area 21, the information processing device 1 changes the symbols 500 of the first video reel 50 at the position where the special symbols 510 are rearranged to the replacement symbols 511 of a more advantageous function and output the result of the slot game. The function of the replacement symbols 511 is determined according to the symbols 500 before the change, and the correspondence relationship is stored in advance in a symbol correspondence table (see FIG. 7 described later) of a memory included in the information processing device 1.

As a result, both the first video reel 50 and the second video reel 51 are scroll-displayed and stop-displayed in the symbol display area 21 of the display 2, and the symbols 500 of the first video reel 50 are rearranged in the symbol display area 21, and then, when the special symbols 510 of the second video reel 51 is rearranged, the symbols 500 of the first video reel 50 at the position where the special symbols 510 are rearranged is changed to the replacement symbols 511 having an advantageous function according to the correspondence relationship stored in the memory to be reflected in the result of the slot game.

The special symbol 510 is not limited to a size that completely hides the symbol 500, and may be a size that hides at least a part of the symbol 500 at the time of stop or synchronized scrolling. Further, in the present embodiment, the symbol array of the second video reel 51 is scroll-displayed simultaneously with the scroll display of the symbol array of the first video reel 50, but the present invention is not limited to this. For example, a part of the symbol array of the second video reel 51 may be displayed after the stop display of the first video reel 50. Further, in this case, between the start of the scroll display of the first video reel 50 and the display of a part of the symbol array of the second video reel 51, the special symbols 510 used only for effects not related to the symbol array of the second video reel 51 may display a scrolled image. Also, a blank symbol indicates that nothing is displayed and that the display of the symbols 500 on the first video reel 50 is not inhibited.

(Machine Configuration)

As described above, the information processing device 1 includes the display 2 provided on the front surface of the housing 11 and the touch panel 5 provided on the entire surface of the display 2. In the present embodiment, the information processing device 1 exemplifies a smartphone, but it may be either a portable type or a stationary type. Examples of the portable information processing device 1 include portable information devices such as a portable computer, a laptop computer, a tablet personal computer, a handheld personal computer, and a PDA (Personal Data Assistant).

The display 2 is configured to be able to display images. The display method of the display 2 is, for example, liquid crystal, organic electroluminescence, CRT (Cathode Ray Tube), and plasma. The touch panel 5 is configured to be able to detect the coordinates of the site where the user's finger and the like touch. The touch panel 5 employs the known technique such as the electromagnetic induction method and the electrostatic capacitance method. The information processing device 1 determines the object on the screen touched by the user and the touch state such as a swipe based on the coordinates detected by the touch panel 5. Then, the information processing device 1 makes a response according to the determination result.

The touch panel 5 is not limited to being provided on the entire surface of the display 2. For example, the touch panel 5 may be provided on the back side opposite to the display 2 of the housing 11. Further, the touch panel 5 may be provided on a part of the display 2.

In the following description, the lower end direction may be referred to as "lower direction" or simply "lower", the upper end direction may be referred to as "upper direction" or simply "upper", the left end direction may be referred to as "left direction" or simply "left", and the right may be referred to as "right direction" or simply "right", when the display 2 is viewed from the front.

In the following description, the description "selection or touch operation on an object by a user" means that the information processing device 1 determines that the user has selected an object for the user's operation received by the touch panel 5.

In addition, in the present embodiment, the touch panel 5 functions as an input unit, receives a swipe input and a touch input, and the like, but it is not limited to this. For example, as an input unit, it may be a microphone, a camera, or the like, which may receive the user's voice and gesture as an instruction to operate.

(Electrical Configuration)

Figure 2:
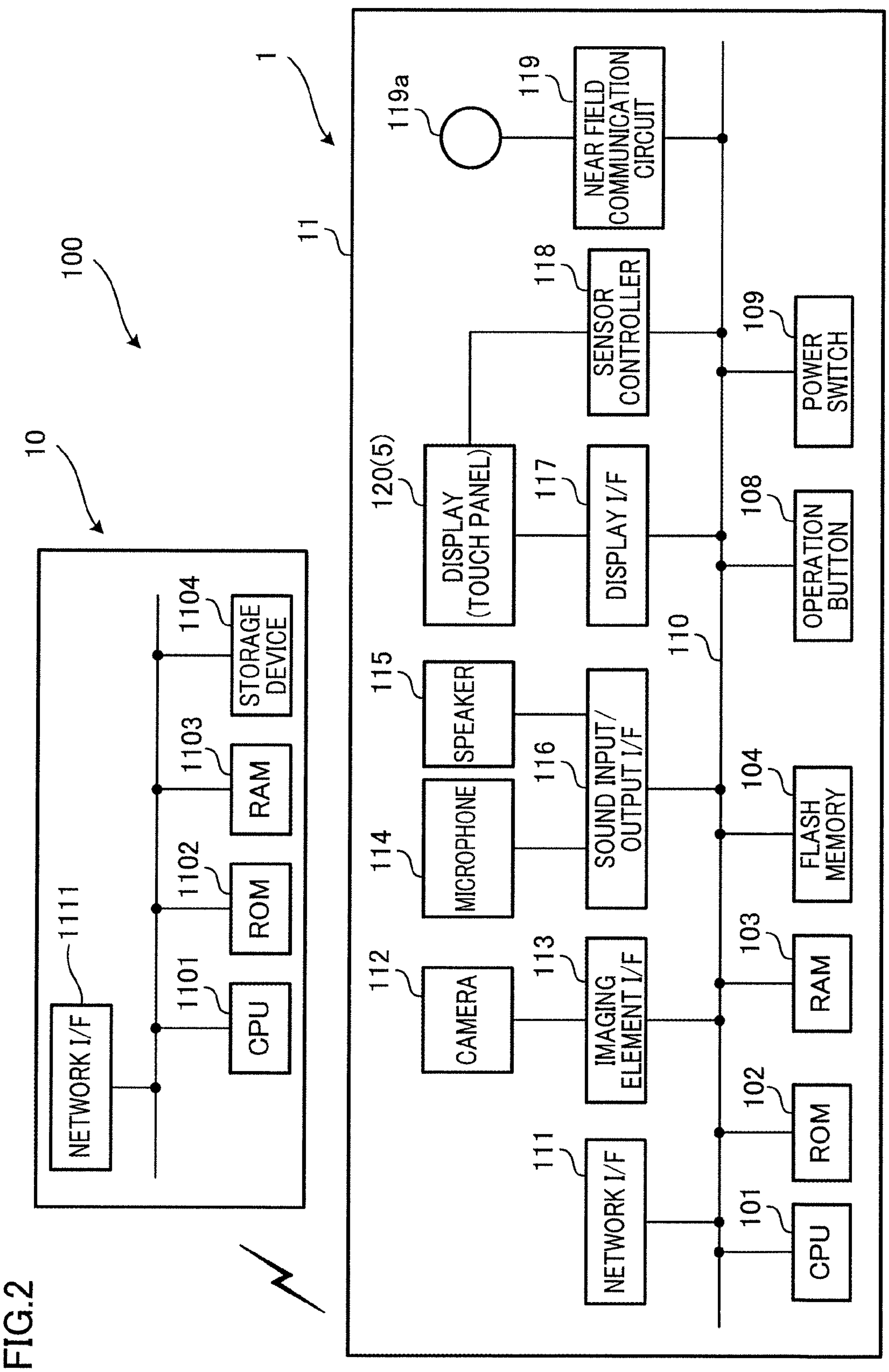
FIG. 2 is a block diagram showing an electrical configuration of the information processing device of FIG. 1.

As shown in FIG. 2, the information processing device 1 includes, in a casing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119a of the near field communication circuit 119.

The server 10 is a so-called computer including a CPU 1101, a ROM 1102, a RAM 1103, a storage device 1104 such as a hard disk drive, and a network I/F 1111.

The CPU (Central Processing Unit) 101 functions as a main configuration of a controller in the information processing device 1 and controls the overall operation of the information processing device 1. The CPU 1101 functions as a main configuration of a controller in the server 10 and controls the overall operation of the server 10. That is, the CPUs 101 and 1101 function as a controller that controls the overall operation of the game system 100. The ROM (Read Only Memory) 102 stores a program used to drive the CPU 101, such as an IPL (Initial Program Loader).

The random access memory (RAM) 103/RAM 1103 is used as a working area of the CPU 101/CPU 1101. The operation button 108 is a button operated when the information processing device 1 is initially set. The power switch 109 is a switch for switching on/off of the power of the information processing device 1.

The flash memory 104 as a memory is a non-transitory recording medium readable by a computer that stores various data such as game programs, communication programs, image data, and sound data. The storage device 1104 functions as a database, and is a non-transitory recording medium readable by a computer that stores game data for each of the plurality of information processing device 1. In response to a request from the game program of the information processing device 1, the server 10 returns a response by referring to the database of the storage device 1104 as appropriate.

For example, the flash memory 104 stores various programs including a game program executed by the CPU 101 as a controller and various data used by the various programs. In other words, the program causes the information processing device 1 which is a computer including the CPU 101 and the flash memory 104 to execute the process of various programs. When the information processing device 1 is considered as the game system 100, the flash memory 104/storage device 1104 stores various programs including a game program executed by the CPU 101/CPU 1101 as a controller and various data used by various programs. In other words, the program causes the information processing device 1 which is the game system 100 including the CPU 101, the CPU 1101, the flash memory 104, and the storage device 1104 to execute the process of various programs. Thus, the process and operation of the information processing device 1 can be replaced with a program and a game control method. Thus, the process and operation of the information processing device 1 can be replaced with a game program and a game control method.

The data and programs stored in the flash memory 104 and the storage device 1104 may be stored in advance at the factory shipment stage, or may be downloaded and stored by communication means from a server (not shown) or the like. The communication means may be a transmission path that can communicate bi-directionally, such as the Internet or cable television, or may be a broadcast that transmits information only in one direction. Also, data and programs stored in the flash memory 104 and the storage device 1104 are stored in a recording medium such as a floppy disk, CD-ROM, DVD-ROM, MO (magneto-optical disk), flash memory, etc, and they may be read from the recording medium and installed as required.

The network I/F (Interface) 111/network I/F 1111 is an interface for performing data communication by utilizing a communication network such as the Internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 2 under the control of the CPU 101. The display 2 is provided on the front surface of the housing 11. The sensor controller 118 is a circuit for receiving an input from the touch panel 5 of the display 2. The near field communication circuit 119 is a communication circuit based on NFC (Near Field Communication) (Registered Trademark), Bluetooth (Registered Trademark), or the like. The bus line 110 is an address bus, a data bus, or the like for electrically connecting the components such as the CPU 101.

(Slot Game: Definition)

The slot game is made playable by the user as a game element in the installed application. The slot game is a game in which a plurality of symbols 500 stop after changing in the symbol display area 21 (rearrangement), and a game value is given by a combination of the symbols 500 displayed in the symbol display area 21. The state in which the plurality of symbols 500 stop after changing in the symbol display area is referred to as "rearrangement". In the slot game, a normal game may be played, and a bonus game that is more advantageous to the user than the normal game may be executed when predetermined conditions in the normal game are satisfied.

The game value is artificially used as a substitute for a credit in the game, and is used for a bet as a slot game execution condition. That is, the user bets game value to play one slot game (unit game), and can gain game value as a result of the slot game.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

(Slot Game: Function Block)

Figure 3:
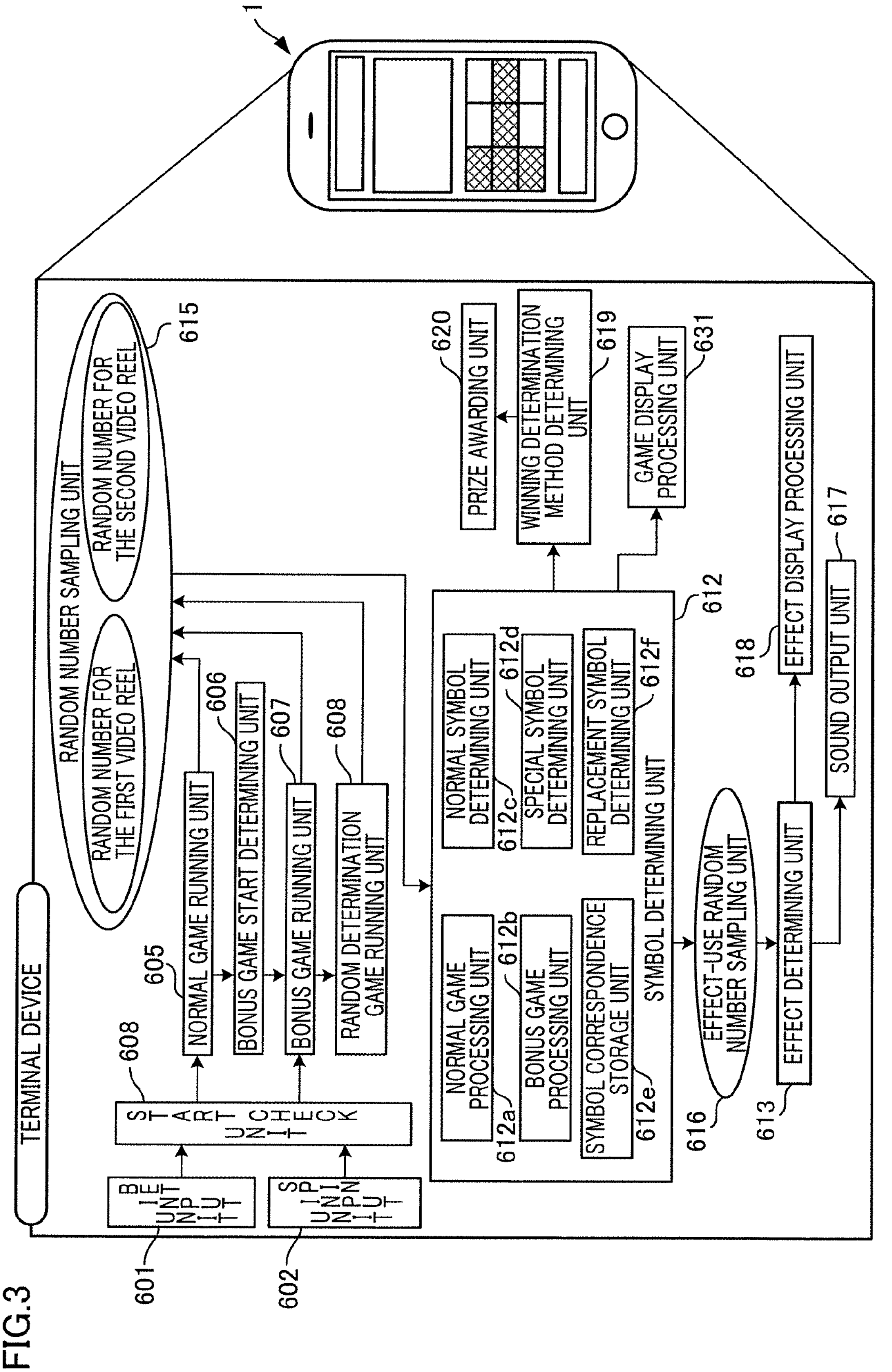
FIG. 3 is a functional block diagram of the information processing device of FIG. 1.

As shown in FIG. 3, the information processing device 1 which is the gaming machine running the slot game has the following functions. To be more specific, the information processing device 1 includes a BET input unit 601 and a spin input unit 602. The BET input unit 601 and the spin input unit 602 are input devices. The BET input unit 601 has a function of receiving a bet in response to a user's operation. The spin input unit 602 has a function of receiving a user's operation, i.e., an instruction to start a game.

In addition, the information processing device 1 includes a start check unit 603, a normal game running unit 605, a bonus game start determining unit 606, a bonus game running unit 607, a random determination game running unit 608, a random number sampling unit 615, a symbol determining unit 612, an effect-use random number sampling unit 616, an effect determining unit 613, a sound output unit 617, an effect display processing unit 618, a winning determining unit 619, a prize awarding unit 620, a game display processing unit 631, and a winning determination method determining unit 640.

The normal game running unit 605 has a function of running a normal game which is a base game, on condition that the BET input unit 601 is operated. The bonus game start determining unit 606 determines whether to run a bonus game, based on a combination of the symbols rearranged in the normal game. In other words, the bonus game start determining unit 606 has functions of: determining that the player is entitled to a bonus game when a bonus symbol is rearranged; and activating the bonus game running unit 607 so as to run a bonus game from the subsequent unit game. The random determination game running unit 608 has a function of random determination including multiple bonuses of the bonus game, and the bonus game can be repeatedly executed by executing after the bonus game running unit 607.

The random number sampling unit 615 determines a random number for outputting the result of the slot game. Specifically, the random number sampling unit 615 has a function of determining a random number for the first video reel 50 and a random number for the second video reel 51, and a function of outputting the determined two random numbers to the symbol determining unit 612. The random number may be one or two or more.

The symbol determining unit 612 has a normal game processing unit 612*a*, a bonus game processing unit 612*b*, a normal symbol determining unit 612*c*, a special symbol determining unit 612*d*, a symbol correspondence storage unit 612*e*, and a replacement symbol determining unit 612*f*.

The symbol determining unit 612 including these processing units 612*a*, 612*b*, 612*c*, 612*d*, 612*e*, and 612*f* has a function of executing the following in the normal game and the bonus game. That is, the symbol determining unit 612 has a function of determining symbols 500 to be rearranged in the symbol display area 21 from the symbol array of the first video reel 50 using the random number for the first video reel 50 from the random number sampling unit 615. In addition, the symbol determining unit 612 has a function of determining to which kind of replacement symbol 511 the symbol 500 at the position where the special symbol 510 is rearranged is changed based on the correspondence between the symbol 500 of the first video reel 50 and the replacement symbol 511 stored in the symbol correspondence storage unit 612*e*, when the special symbol 510 is rearranged in symbol display area 21. In addition, the symbol determining unit 612 has a function of performing control to rearrange the determined symbol 500 in the symbol display area 21 of the display 2. In addition, the symbol determining unit 612 has a function of performing control to rearrange the determined symbol (blank symbol, special symbol 510) of the second video reel 51 in the symbol display area 21 of the display 2. In addition, the symbol determining unit 612 has a function of outputting final symbol rearrangement information to the winning determination method determining unit 619. In addition, the symbol determining unit 612 has a function of outputting an effect instruction signal to the effect-use random number sampling Unit 616 based on a combination of symbol rearrangements.

The effect-use random number sampling unit 616 has a function of sampling effect-use random number and a function of outputting the effect-use random number to the effect determining unit 613 when receiving the effect instruction signal from the symbol determining unit 612. The effect determining unit 613 has a function of determining the effect using the effect-use random number, a function of outputting image information of the determined effect to the effect display processing unit 618, and a function of outputting sound and light emission information of the determined effect to the sound output unit 617. Based on the effect determined by the effect determining unit 613, the effect display processing unit 618 a function of displaying a play image of the slot game in which the first video reel 50 having a symbol array where a plurality of symbols 500 are arranged and the second video reel 51 having a symbol array where blank symbols making the plurality of symbols 500 of the first video reel 50 visible and displayed with superimposition on the first video reel 50 and at least one special symbol 510 capable of hiding at least one symbol 500 of the first video reel 50 are arranged are scrolled and stopped, a function of performing an effect changing the special symbol 510 to the replacement symbol 511 when the special symbol 510 is rearranged in the symbol display area 21, and a function of displaying the result of the slot game.

In the present embodiment, the process and operation are described assuming that the information processing device 1 as a smartphone has these functions, but the functions may be distributed to the elements of the game system 100. For example, the server 10 may make a random determination for determining the result of the slot game.

(Slot Game: Game Content)

The information processing device 1 has two types of game modes in the slot game, a normal game mode and a bonus game mode. The normal game mode is a game state in a normal game, and the bonus game mode corresponds to a game state in a free game. The information processing device 1 executes a unit game mainly in the normal game mode, and shifts the game mode to the bonus game mode when a bonus trigger condition is satisfied in the normal game mode. For example, the trigger of the bonus game is a condition that three or more bonus symbols appear (are rearranged). The trigger of the bonus game may be another condition.

(Slot Game: Game Content: Normal Game Mode)

Specifically describing the normal game mode, in the game area displayed on the display 2 (see FIG. 1), the slot game symbols of the video reels can be rearranged in 3 rows and 5 columns. In the betting process, the bet number is selected by the user. For example, as the bet number, 1, 2, 3, 5, 10, etc. can be selected by the operation of a bet button, or a desired number may be input. Then, the capital accumulated by accumulating a part of these bets is considered as a jackpot.

Next, in the game area, when symbols are rearranged by displaying the video reels in a change manner (scroll movement) and in a stop manner (scroll stop), it is determined whether or not a prize is won. Then, the winning determination is performed based on the state of the rearrangement of the rearranged symbols. For example, if three or more bonus symbols are rearranged in the game area, the bonus game trigger is won.

(Slot Game: Game Content: Bonus Game Mode)

In the normal game mode, when the trigger condition of the bonus game is established, the bonus game mode is entered, and the free game process is first executed.

In the free game process, a reel belt for the free game to be used during the free game is determined, and a predetermined number of free games is set. The reel belt for the free game and the number of free games may be set by random number random determination from a plurality of determinations.

When the free game is executed, a winning determination is made. The winning determination may be the same as the winning determination in the normal game. For example, when three or more bonus symbols appear again in the game area, the retrigger condition of the bonus game (free game) is established, and the number of free games is added.

After this, it is determined that the free game has ended, and if all the free games have not been consumed, the free games continue and the remaining free games are executed.

(Scroll and Stop Display)

The scrolling and stopping of the first video reel 50 and the second video reel 51 displayed in the symbol display area 21 of the display 2 will be described.

Figure 4A:
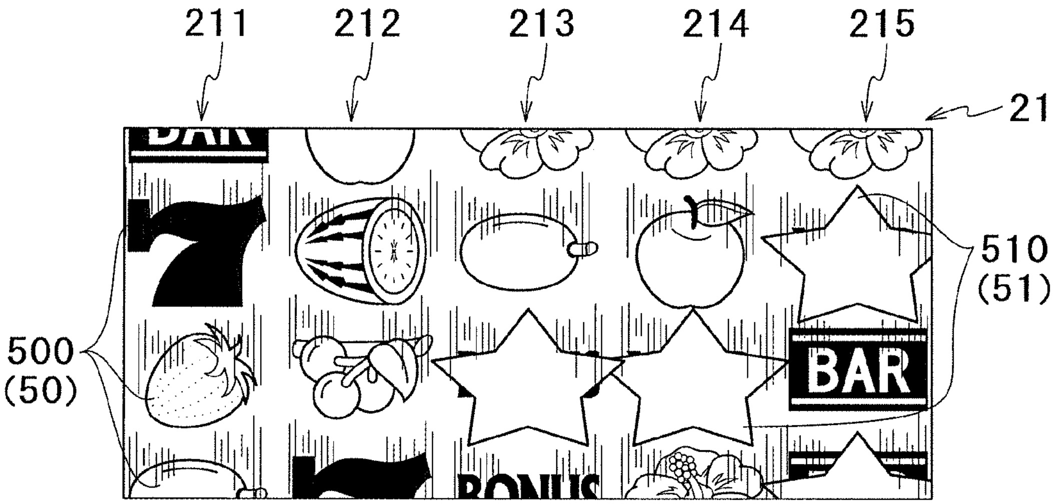
FIG. 4A is a view showing an example of display of a first video reel and a second video reel.

As shown in FIG. 4A, the symbol display area 21 of the display 2 is provided with scroll areas 211, 212, 213, 214, 215 for scrolling the symbol array. When the slot game is started, scrolling in a state where the first video reel 50 and the second video reel 51 are synchronized is started in the scroll areas 211, 212, 213, 214, 215. That is, the scrolling is performed in a state where the symbols 500 of the first video reel 50 are hidden at the positions where the special symbols 510 are arranged in the second video reel 51.

Figure 4B:
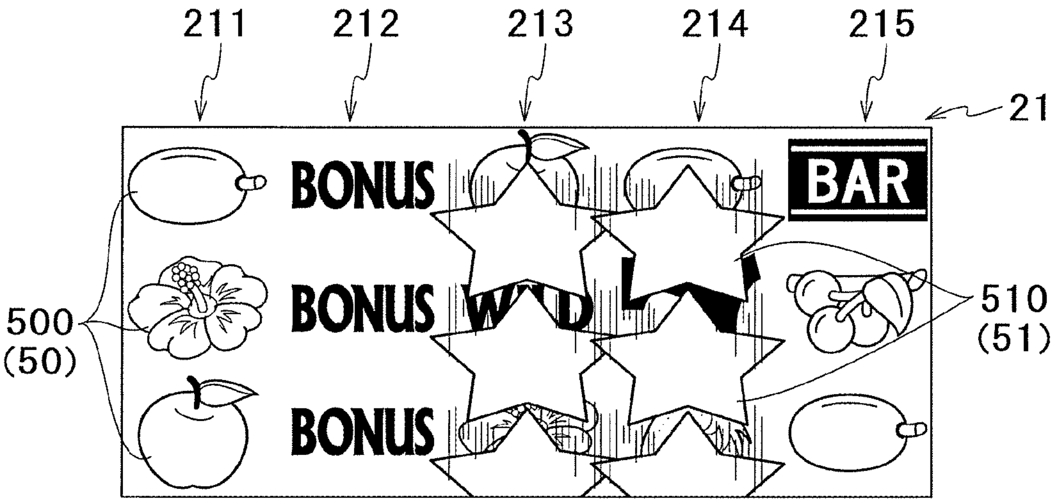
FIG. 4B is a view showing an example of display of the first video reel and the second video reel.

Next, as shown in FIG. 4B, in the symbol display area 21, the scroll of the first video reel 50 in the scroll areas 211, 212, 213, 214, 215 is stopped while the second video reel 51 is scrolled, and the symbols 500 are rearranged. The first video reel 50 is sequentially stopped from the scroll area 211 to the scroll area 215.

Figure 4C:
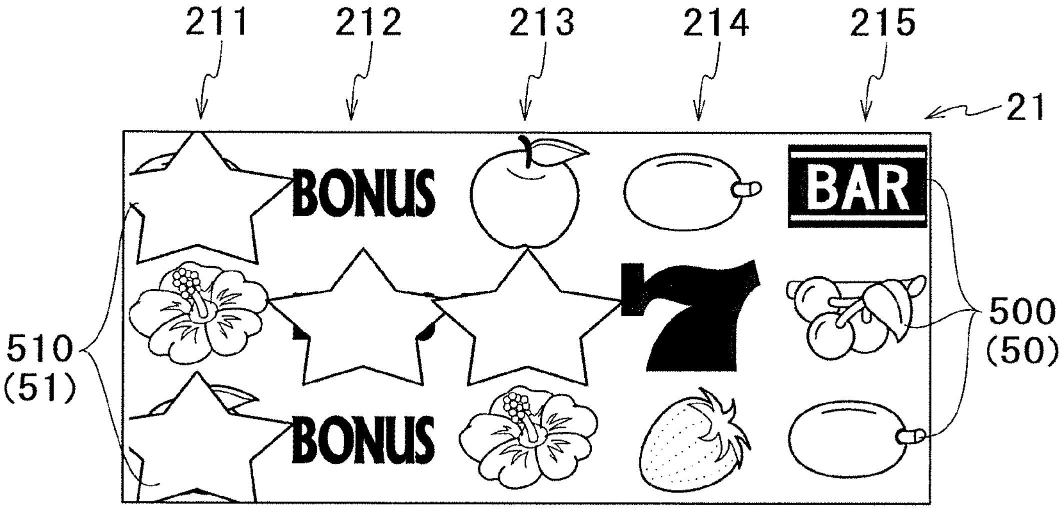
FIG. 4C is a view showing an example of display of the first video reel and the second video reel.

Then, as shown in FIG. 4C, the second video reel 51 is stop-displayed in the symbol display area 21. When the special symbols 510 are rearranged in the symbol display area 21, the symbols 500 of the cell at the same positions as the special symbols 510 are hidden by the special symbols 510.

Figure 4D:
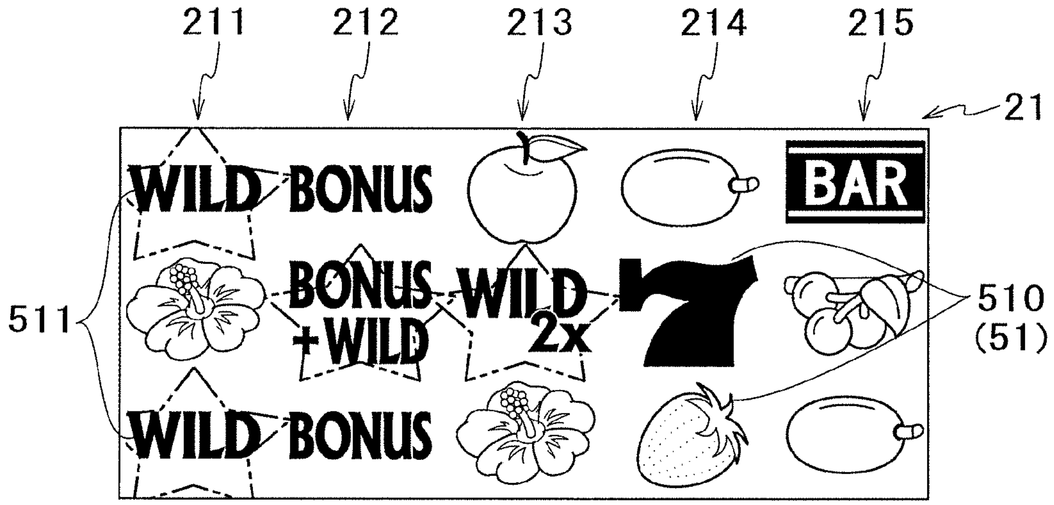
FIG. 4D is a view showing an example of display of the first video reel and the second video reel.

Then, as shown in FIG. 4D, the symbols 500 of the cell at the same positions as the special symbols 510 are changed to replacement symbols 511. The replacement symbol 511 is a type according to the type of the symbol 500 stored in the symbol correspondence table (see FIG. 7) described later. For example, when the special symbol 510 stops at the bonus symbol, the bonus symbol is replaced with the replacement symbol 511 having the functions of both the bonus symbol and the wild symbol. The replacement symbol 511 will be described later. (Data table) The data table stored in the information processing device 1 will be described.

(Data Table: Symbol Array Table of the First Video Reel)

The flash memory 104 of the information processing device 1 stores a symbol array table of the first video reel shown in FIG. 5. REELs 1 to 5 indicate the respective scroll areas, and indicate symbols 500 constituting a symbol array to be scrolled and stopped. Code numbers “0” to “28” are assigned to each symbol 500, and are used to identify the symbols 500 in each symbol array.

The types of symbols 500 include a “BONUS” symbol for triggering a bonus game, a “WILD” symbol which can replace the other symbols 500 except the “BONUS” symbol, a “BAR” symbol, a “FLOWER” symbol, a “STRAWBERRY” symbol, a “PLUM” symbol, an “APPLE” symbol, a “WATERMERLON” symbol, a “CHERRY” symbol, etc.

The random determination for determining symbols 500 to be rearranged is performed for each symbol array, and the code number of each symbol array is determined. For example, if the code number is determined to be “0” in “REEL 1”, the “7” symbol of code number “0”, “BAR” symbol of code number “1”, “7” symbol of code number “2” will be rearranged in “REEL 1”.

(Data Table: Symbol Array Table of the Second Video Reel)

The flash memory 104 of the information processing device 1 stores a symbol array table of the second video reel shown in FIG. 6. REELs 1 to 5 indicate the respective scroll areas, and indicate the symbols of the second video reels constituting the symbol array to be scrolled and stopped. Code numbers “0” to “35” are assigned to each symbol, and are used to identify symbols in each symbol array.

The symbol array of the second video reel is composed of a “WILD” symbol, which can replace other symbols 500 except a “BONUS” symbol, and blank symbols.

In the present embodiment, the random determination for determining the symbols 500 to be rearranged is performed collectively for all the scroll areas. That is, when the code number is determined to be “0” in “REEL 1”, symbols of code numbers “0” to “2” are rearranged in each of REELs 1 to 5. In addition, it is not limited to this, a random determination in each of the scroll areas may be performed.

In the present embodiment, all the probabilities of rearrangement of each symbol in the symbol array are set equal. That is, the probability of rearrangement increases as the number of types of symbols increases in the symbol array. A weight may be set to each symbol in each symbol array, and a random determination probability may be set according to the weight.

(Data Table: Symbol Correspondence Table)

The flash memory 104 of the information processing device 1 stores a symbol correspondence table shown in FIG. 7. The symbol correspondence table usually has a symbol column and a replacement symbol column. The symbols 500 of the first video reel 50 are discriminably stored in the normal symbol column. The replacement symbols 511 for replacing the symbols 500 when the special symbols 510 are rearranged are stored in the replacement symbol column. That is, when the special symbols 510 are rearranged in the symbol display area 21, the information processing device 1 determines the replaced replacement symbols 511 with reference to the symbol correspondence table for the symbol 500 at the position where the special symbols 510 are rearranged.

Specifically, when the special symbol 510 stops at the “WILD” symbol, the “WILD” symbol is replaced with a “WILD 2×” symbol. The “WILD 2×” symbol, like the “WILD” symbol, has a function that can replace the other symbols 500 except for the “BONUS” symbol, and has a function to double the payout amount by a winning combination when the winning combination including the “WILD 2×” symbol is established.

Here, the winning combination indicates a combination of symbols related to winning. When the winning combination is established on a payline in which a cell is selected one by one from each scroll area, a winning is achieved, and a payout according to the bet amount and the type of winning combination won is awarded.

Also, when the special symbol 510 stops at the “BONUS” symbol, the “BONUS” symbol is replaced with a “BONUS+WILD” symbol. The “BONUS+WILD” symbol has a function that can replace the other symbols 500 except the “BONUS” symbol as well as the “WILD” symbol, and also has a function as the “BONUS” symbol that can establish a bonus trigger.

Thus, when the special symbol 510 is rearranged to the “BONUS” symbol having the function of triggering the bonus game, the information processing device 1 outputs the result of the slot game by changing the “BONUS” symbol to a symbol having a function of triggering a bonus game and a function of another alternative “WILD” symbol.

Thus, in the case where a bonus symbol that does not generally constitute a winning combination is rearranged in the symbol display area 21 and the bonus game is not triggered, although the bonus symbol inhibits the winning combination by other symbols, since the special symbol 510 can be rearranged to enable the bonus symbol to have another alternative function, the effectiveness of the bonus symbol can be improved.

Also, when the special symbol 510 stops at another symbol of the symbols 500, the symbol 500 is replaced with the "WILD" symbol. Thus, the replacement symbol 511 may be a symbol included in the symbols 500.

The replacement symbol 511 is not limited to this, and may be replaced by, for example, the symbol 500 adjacent to the rearranged special symbol 510, or may be replaced by a scatter symbol to which a payout is individually given, or any combination of the above.

(Operation)

Next, a game program executed by the CPU 101 of the information processing device 1 will be described.

(Operation: Slot Game Process)

A game program of slot game process executed by the CPU 101 of the information processing device 1 will be described.

Figure 8:
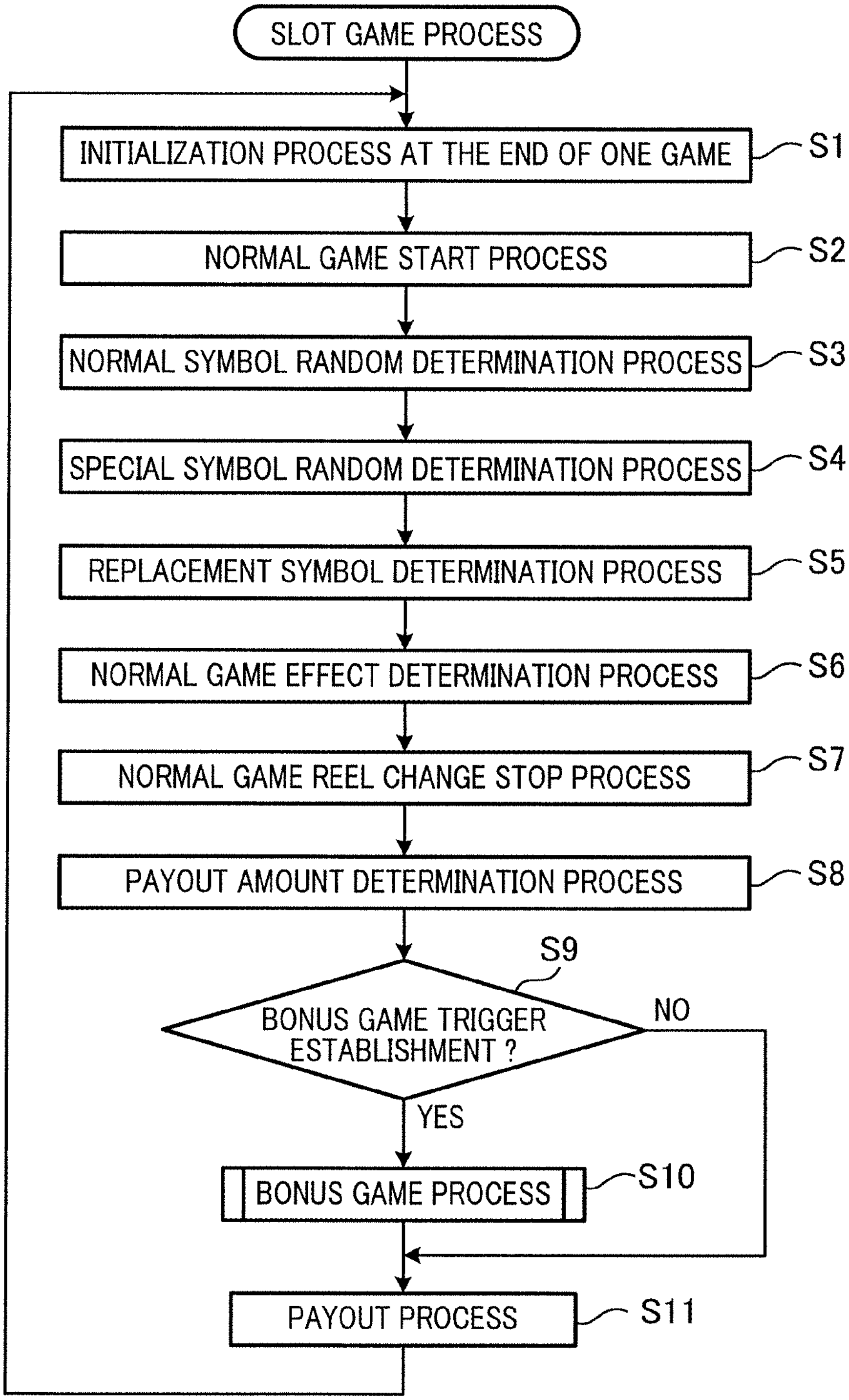
FIG. 8 is a flowchart of a slot game process.

As shown in FIG. 8, the CPU 101 executes an initialization process at the end of one game (S1). The CPU 101 clears data that becomes unnecessary for each game in the working area of the RAM 103, such as the bet number and symbols determined by the random determination, for example. Then, the CPU 101 executes a normal game start process (S2). In the normal game start process, the CPU 101 performs input check of the bet amount and the like selected on the touch panel 5 or the like. Thereafter, the CPU 101 executes a normal game symbol random determination process (S3). In this process, the CPU 101 performs the random determination and determination of symbols 500 to be stopped based on a random number with reference to the symbol array table of the first video reel (see FIG. 5).

Then, the CPU 101 executes a special symbol random determination process (S4). In this process, the CPU 101 performs the random determination and determination of symbols to be stopped based on a random number, using the symbol array table of the second video reel. Then, the CPU 101 executes a replacement symbol determination process (S5). In this process, the CPU 101 refers to the scheduled stop symbol of the second video reel 51 determined in step S4, specifies the positions of all the cells in which the special symbol 510 is to be rearranged, and determines the replacement symbol 511 corresponding to the symbol 500 to be rearranged in the specified cell with reference to the symbol correspondence table (see FIG. 7).

Next, the CPU 101 executes a normal game effect determination process (S6). The CPU 101 samples a effect-use random number, and determines one of a plurality of predetermined effects by the random determination based on the scheduled stop symbol of the first video reel 50, the scheduled stop symbol of the second video reel 51, and the replacement symbol 511 after change.

Next, the CPU 101 executes a normal game reel change stop process (S7). In this process, the CPU 101 executes control to display an effect on the display 2 and output sound through the speaker 115 based on the effect determined in step S6. For example, the CPU 101 executes control to display on the display 2 a play image of scrolling and stopping of the first video reel 50 and the second video reel 51, as shown in FIGS. 4A, 4B, 4C, and 4D.

Next, the CPU 101 executes a payout amount determination process (S8). Specifically, after replacing the symbol 500 at the position where the special symbol 510 is arranged with the replacement symbol 511, the CPU 101 determines whether or not a winning combination is established in the set payline, and determines the payout amount for all winnings associated with the payline if the winnings are achieved.

Next, the CPU 101 determines whether a bonus game trigger is established or not (S9). When it is determined that the bonus game trigger is established (S9: YES), the CPU 101 executes a bonus game process (S10).

On the other hand, when the bonus game trigger is not established (S9: NO), or after the bonus game process of step S10 is executed, the CPU 101 executes a payout process (S11). Specifically, the CPU 101 adds the value stored in a payout amount storage area to the value stored in a credit number storage area provided in the RAM 103 (credit number counter). Thereafter, the CPU 101 re-executes the process from 51.

(Bonus Game Process)

Figure 9:
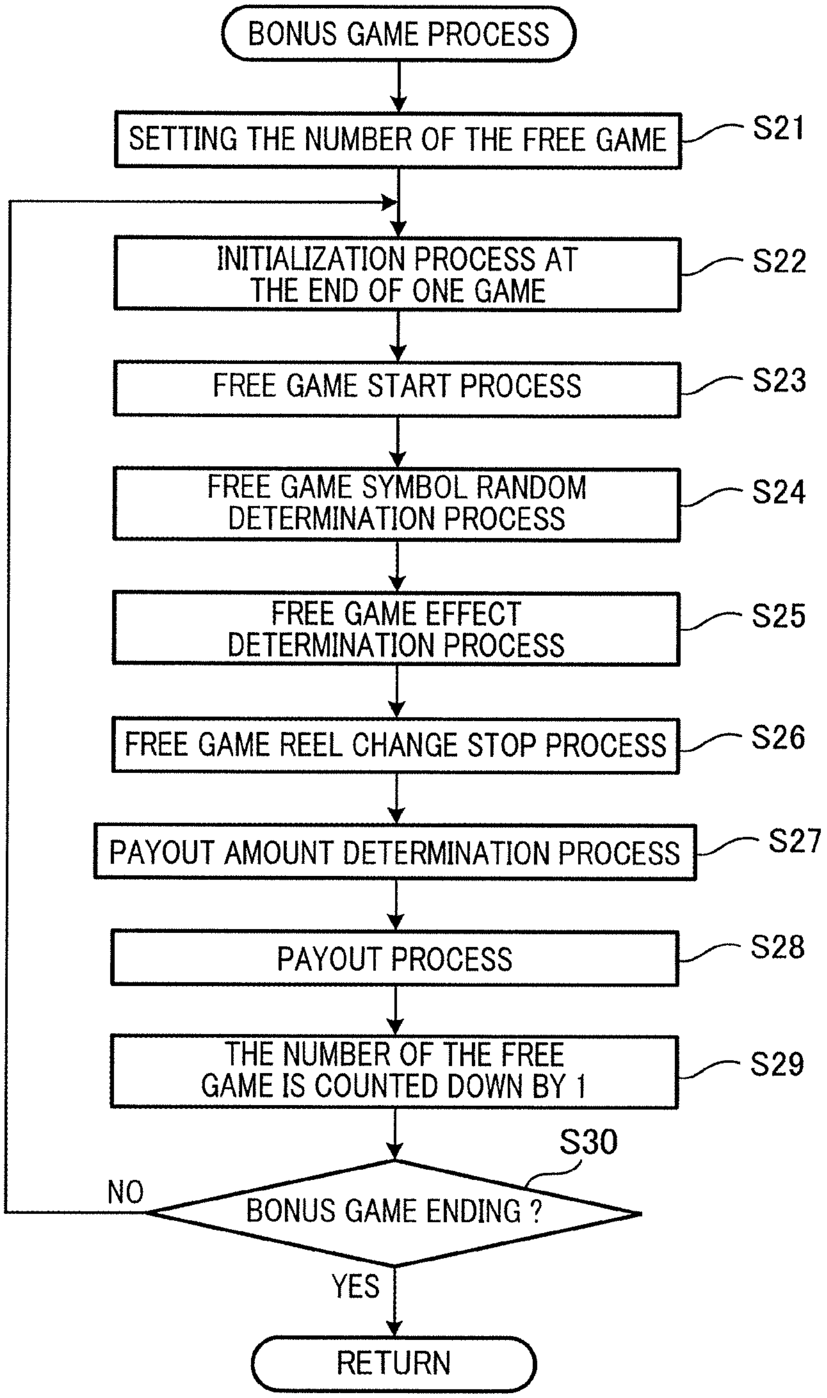
FIG. 9 is a flowchart of a bonus game process.

Next, with reference to FIG. 9, a game program of bonus game process which is a subroutine of slot game process executed by the CPU 101 of the information processing device 1 will be described.

First, the CPU 101 sets the number of free games (S21). For example, the CPU 101 sets 5 as the number of free games. Thereafter, the CPU 101 executes an initialization process at the end of one game (S22). For example, the CPU 101 clears data that becomes unnecessary for each game in the working area of the RAM 103, such as symbols determined by random determination. The bet number in the bonus game is the same as that in the normal game immediately before the transition to the bonus game.

After this, the CPU 101 executes a free game start process (S23), a free game symbol random determination process (S24), a free game effect determination process (S25), a free game reel change stop process (S26), a payout amount determination process (S27), and a payout process (S28), as in the base game.

In the free game, a symbol random determination table for the free game different from the symbol array table of the first video reel and the symbol array table of the second video reel used in the base game may be used. In this case, it is preferable that the symbol random determination table for the free game is more advantageous than the one for the normal game. For example, in the symbol array table of the first video reel for the free game, the percentage of symbols related to winning combinations with a large payout amount is higher (or the stopping probability is higher), the number of wild symbols is larger (or the stopping probability is higher), the number of bonus symbols is larger (or the stopping probability is higher) and the like, for example. Further, in the symbol array table of the second video reel for the free game, the number of special symbols 510 is larger (or the stopping probability is higher) than that for the normal game, for example.

After this, the CPU 101 counts down the set number of free games by one (S29). Then, the CPU 101 determines whether the bonus game has ended (S30). If the number of free games is not 0 (S30: NO), the CPU 101 determines that the bonus game has not ended, and re-executes the free game from the process of S22. On the other hand, if the number of free games is 0 (S30: YES), the CPU 101 determines that the bonus game has ended, terminates the present subroutine, and returns to the slot game process.

Although not shown, when the payout amount is determined in the slot game process and the bonus game process, the CPU 101 executes a process to transmit the payout amount as the winning amount to the server 10.

SUMMARY OF THE INVENTION

The information processing device 1 according to the present invention comprises: a display 2 for displaying a play image of a slot game, and in the play image, the scroll and stop of a first video reel 50 and a second video reel 51 are repeated in a symbol display area 21, and wherein the first video reel has a symbol array in which a plurality of symbols 500 are arranged, and the second video reel has a symbol array in which blank symbols making the plurality of symbols 500 of the first video reel 50 visible and displayed with superposition on the first video reel 50 and at least one special symbol 510 which is capable of hiding at least one symbol 500 of the first video reel 50 are arranged; a flash memory 104 storing a symbol correspondence table, wherein the symbol correspondence table is one in which a symbol 500 of the first video reel 50 and a replacement symbol 511 of a function that is more advantageous than the symbol 500 are associated with each other; and a CPU 101, wherein in the slot game, the CPU 101 performs a process of randomly determining symbols to be rearranged within the symbol display area 21 for each of the first video reel 50 and the second video reel 51, a process of displaying an image for rearranging symbols of the second video reel 51 in the symbol display area 21 after rearranging the symbols 500 of the first video reel 50 in the symbol display area 21 based on the random determination, and a process of changing the symbol 500 of the first video reel 50 at a position where a special symbol 510 is rearranged to the replacement symbol 511 of a corresponding function in the symbol correspondence table based on the symbol correspondence table when the special symbol 510 is rearranged in the symbol display area 21 and outputting the result of the slot game.

According to the above configuration, after both the first video reel 50 and the second video reel 51 are scroll-displayed and stop-displayed within the symbol display area 21 of the display 2, and the symbols 500 of the first video reel 50 are rearranged in the symbol display area 21, when the special symbols 510 of the second video reel 51 are rearranged, a symbol 500 of the first video reel 50 at the position where the special symbol 510 is rearranged is changed to the replacement symbol 511 having an advantageous function associated with the symbol 500 of the first video reel 50 according to the symbol correspondence table stored in the flash memory 104 to be reflected in the result of the slot game. Thereby, the function of the symbol 500 at the position where the special symbol 510 of the second video reel 51 is rearranged can be easily changed by maintaining the symbol correspondence table stored in the flash memory 104, and it is possible to improve the application range of the double reels.

In the information processing device 1 of the present invention, when the special symbol 510 is rearranged to a bonus symbol having a function of triggering a bonus game, the CPU 101 outputs the result of the slot game, in which the bonus symbol may be changed to a symbol having a function of triggering the bonus game and another alternative function.

Generally, when a bonus symbol that does not constitute a winning combination is rearranged in a symbol display area 21 and the bonus game is not triggered, the bonus symbol inhibits the winning combination by other symbols. According to the above configuration, rearrangement of the special symbol 510 enables the bonus symbol to have other alternative functions as well, which makes it possible to improve the effectiveness of the bonus symbol.

The flash memory 104 (storage medium) of the present invention is a non-transitory storage medium for storing a game program, the game program, when running on a computer having a display 2 and the flash memory 104, performing: a process of displaying a play image of a slot game in a symbol display area 21 of the display 2, and wherein the scroll and stop of a first video reel 50 and a second video reel 51 are repeated, and wherein the first video reel has a symbol array in which a plurality of symbols 500 are arranged, and the second video reel has a symbol array in which blank symbols making the plurality of symbols 500 of the first video reel 50 visible and displayed with superposition on the first video reel 50 and at least one special symbol which is capable of hiding at least one symbol 500 of the first video reel 50 are arranged; a process of storing a symbol correspondence table in which a symbol 500 of the first video reel 50 and a replacement symbol 511 of a function that is more advantageous than the symbol 500 are associated with each other in the flash memory 104; a process of randomly determining symbols to be rearranged within the symbol display area 21 for each of the first video reel 50 and the second video reel 51 in the slot game; a process of displaying an image for rearranging symbols of the second video reel 51 in the symbol display area 21 after rearranging the symbols 500 of the first video reel 50 in the symbol display area 21 based on the random determination; and a process of changing the symbol 500 of the first video reel 50 at a position where a special symbol 510 is rearranged to a replacement symbol 511 of a corresponding function in the symbol correspondence table based on the symbol correspondence table when the special symbol 510 is rearranged in the symbol display area 21 and outputting the result of the slot game.

According to the above configuration, after both the first video reel 50 and the second video reel 51 are scroll-displayed and stop-displayed within the symbol display area 21 of the display 2, and the symbols 500 of the first video reel 50 are rearranged in the symbol display area 21, when the special symbols 510 of the second video reel 51 are rearranged, a symbol 500 of the first video reel 50 at the position where the special symbol 510 is rearranged is changed to the replacement symbol 511 having an advantageous function associated with the symbol 500 of the first video reel 50 according to the symbol correspondence table stored in the flash memory 104 to be reflected in the result of the slot game. Thereby, the function of the symbol 500 at the position where the special symbol 510 of the second video reel 51 is rearranged can be easily changed by maintaining the symbol correspondence table stored in the flash memory 104, and it is possible to improve the application range of the double reels.

The game control method of the present invention comprises: displaying a play image of a slot game in a symbol display area 21 of a display 2, wherein the scroll and stop of a first video reel 50 and a second video reel 51 are repeated, and wherein the first video reel has a symbol array in which a plurality of symbols 500 are arranged, and the second video reel has a symbol array in which blank symbols making the plurality of symbols 500 of the first video reel 50 visible and displayed with superposition on the first video reel 50 and at least one special symbols 510 which is capable of hiding at least one symbol 500 of the first video reel 50 are arranged; storing a symbol correspondence table in which a symbol 500 of the first video reel 50 and a replacement symbol 511 of a function that is more advantageous than the symbol of the first video reel are associated with each other in a flash memory 104; randomly determining symbols to be rearranged within the symbol display area 21 for each of the first video reel 50 and the second video reel 51 in the slot game; displaying an image for rearranging symbols of the second video reel 51 in the symbol display area 21 after rearranging the symbols 500 of the first video reel 50 in the symbol display area 21 based on the random determination; and changing the symbol 500 of the first video reel 50 at a position where a special symbol 510 is rearranged to a symbol of a corresponding function in the symbol correspondence table based on the symbol correspondence table when the special symbol 510 is rearranged in the symbol display area 21 and outputting the result of the slot game.

According to the above configuration, after both the first video reel 50 and the second video reel 51 are scroll-displayed and stop-displayed within the symbol display area 21 of the display 2, and the symbols 500 of the first video reel 50 are rearranged in the symbol display area 21, when the special symbols 510 of the second video reel 51 are rearranged, a symbol 500 of the first video reel 50 at the position where the special symbol 510 is rearranged is changed to the replacement symbol 511 having an advantageous function associated with the symbol 500 of the first video reel 50 according to the symbol correspondence table stored in the flash memory 104 to be reflected in the result of the slot game. Thereby, the function of the symbol 500 at the position where the special symbol 510 of the second video reel 51 is rearranged can be easily changed by maintaining the symbol correspondence table stored in the flash memory 104, and it is possible to improve the application range of the double reels.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

In addition, in the above detailed description, for the sake of easier understanding of the present invention, a description has been given focusing on the characteristic part. The present invention is not limited to the embodiment described in the detailed description above, but may be applied to other embodiments, and the applicable range is various. In addition, terms and phraseology used in the present specification are used to clearly describe present invention and are not intended to limit the explanation of present invention. In addition, other configurations, systems, methods, and the like included in the concept of the present invention can be easily derived from the concept of the invention described in the present specification as long as it is a person skilled in the art. Therefore, the description of the claims must be regarded as including equivalent structures without departing from the range of the technical idea of the present invention. In addition, the abstract is intended to allow those skilled in the art, such as in the patent offices and general public offices, who know a little about the legal terms or the professional term and the like, to determine the technical content of the present application and the nature thereof rapidly though a simple search. Accordingly, the abstract is not intended to limit the scope of the invention as evaluated by the claims. In addition, in order to fully understand the purpose of the present invention and the specific effects of the present invention, it is desirable to make full reference and explanation of the already-disclosed document and the like.

The above detailed description includes a process performed by the computer. The above description and the present invention have been written for the purpose of enabling those skilled in the art to understand most effectively. In the present specification, each process used to derive a result should be understood as processes which are not self-contradictory. In addition, in each process, electric or electromagnetic signals are received, transmitted, recorded, or the like. In the processing of each process, such signal is expressed by bit, value, symbol, word, term, number, and the like, but it should be noted that it is used only for the convenience of illustration. In addition, in the processing of each process, there is a case which is described by a common expression with human actions, however, the processes described in this specification are executed in principle by various devices. In addition, the other structure required for performing each process can be clarified by the above description.

What is claimed is:

1. An information processing device comprising:

a display for displaying a play image of a slot game, and in the play image, the scroll and stop of a first video reel and a second video reel are repeated in a display frame, and wherein the first video reel has a symbol array in which a plurality of symbols are arranged, and the second video reel has a symbol array in which blank symbols making the plurality of symbols of the first video reel visible and displayed with superposition on the first video reel and at least one special symbol which is capable of hiding at least one symbol of the first video reel are arranged;

a memory storing a symbol correspondence table, and wherein the symbol correspondence table is one in which a symbol of the first video reel and a symbol of a function that is more advantageous than the symbol of the first video reel are associated with each other; and a controller, and wherein in the slot game, the controller performs:

a process of randomly determining symbols to be rearranged within the display frame for each of the first video reel and the second video reel, a process of displaying an image for rearranging symbols of the second video reel in the display frame after rearranging the symbols of the first video reel in the display frame based on the random determination, and a process of changing a symbol of the first video reel at a position where the special symbol is rearranged to a corresponding symbol of a function that is more advantageous than the symbol of the first video reel in the symbol correspondence table and outputting the result of the slot game.

2. The information processing device of claim 1, wherein the controller changes a bonus symbol having a function of triggering a bonus game to a symbol having a function of triggering the bonus game and another alternative function in the bonus game when the special symbol is rearranged and outputs the result of the slot game.

3. A non-transitory computer readable medium storing a game program, the game program causing a computer including a display and a memory to execute the processes of:

displaying a play image of a slot game in a display frame of the display, and wherein the scroll and stop of a first video reel and a second video reel are repeated, and wherein the first video reel has a symbol array in which a plurality of symbols are arranged, and the second video reel has a symbol array in which blank symbols making the plurality of symbols of the first video reel visible and displayed with superposition on the first video reel and at least one special symbol which is capable of hiding at least one symbol of the first video reel are arranged;

storing a symbol correspondence table in which a symbol of the first video reel and a symbol of a function that is more advantageous than the symbol of the first video reel are associated with each other in the memory;

randomly determining symbols to be rearranged within the display frame for each of the first video reel and the second video reel in the slot game;

displaying an image for rearranging symbols of the second video reel in the display frame after rearranging the symbols of the first video reel in the display frame based on the random determination; and changing a symbol of the first video reel at a position where the special symbol is rearranged to a corresponding symbol of a function that is more advantageous than the symbol of the first video reel in the symbol correspondence table and outputting the result of the slot game.

4. A game control method comprising:

displaying a play image of a slot game in a display frame of a display, and wherein the scroll and stop of a first video reel and a second video reel are repeated, and wherein the first video reel has a symbol array in which a plurality of symbols are arranged, and the second video reel has a symbol array in which blank symbols making the plurality of symbols of the first video reel visible and displayed with superposition on the first video reel and at least one special symbol which is capable of hiding at least one symbol of the first video reel are arranged;

storing a symbol correspondence table in which a symbol of the first video reel and a symbol of a function that is more advantageous than the symbol of the first video reel are associated with each other in a memory;

randomly determining symbols to be rearranged within the display frame for each of the first video reel and the second video reel in the slot game;

displaying an image for rearranging symbols of the second video reel in the display frame after rearranging the symbols of the first video reel in the display frame based on the random determination; and changing a symbol of the first video reel at a position where the special symbol is rearranged to a corresponding symbol of a function that is more advantageous than the symbol of the first video reel in the symbol correspondence table and outputting the result of the slot game.

* * * * *